United States Patent [19]
Ruttgers et al.

[11] 3,804,080
[45] Apr. 16, 1974

[54] DEVICE FOR OBTAINING MEASUREMENT AT OR WITHIN PARTS OF THE HUMAN BODY

[75] Inventors: Helge Ruttgers, Heidelberg; Heribert Lussem, Braunfels/Lahn, both of Germany

[73] Assignee: Hewlett-Packard GmbH, Boblinger, Germany

[22] Filed: Aug. 9, 1972

[21] Appl. No.: 279,121

[30] Foreign Application Priority Data
Aug. 10, 1971 Germany............................ 2140064

[52] U.S. Cl......... 128/2.06 E, 128/DIG. 4, 128/418
[51] Int. Cl................................................ A61b 5/04
[58] Field of Search....... 128/2.06 E, 2.1 E, DIG. 4, 128/416–418, 419 P, 419 C, 419 E, 404, 405, 407–409

[56] References Cited
UNITED STATES PATENTS
3,057,356  10/1962  Greatbatch..................... 128/419 P
3,078,850  2/1963  Schein et al..................... 128/2.1 E
3,472,234  10/1969  Tachick............................. 128/418
3,533,403  10/1970  Woodson...................... 128/2.1 E FOREIGN PATENTS OR APPLICATIONS
238,074  10/1969  U.S.S.R.......................... 128/206 E
1,143,937  2/1963  Germany.......................... 128/404

OTHER PUBLICATIONS
Ruttgers, H., "Noch eine Skalpelektrode fur die direkte fetale Elektrokardiographie", Geburtshilfe Frauenheilkd, Vol. 31, pp. 654–660, July, 1971.

Primary Examiner—Richard A. Gaudet
Assistant Examiner—Lee S. Cohen
Attorney, Agent, or Firm—Stephen P. Fox

[57] ABSTRACT

A measuring head is described for mounting at or within parts of the human body, especially for obtaining ECG signals from a fetus. The measuring head includes electrodes separated from each other and connected to separate leads, in the form of two pointed opposite catchers mounted in an isolating carrier. A cannula may be provided so that liquid medicine or an electrolyte can be supplied to the body at the point of measurement.

5 Claims, 4 Drawing Figures

PATENTED APR 16 1974 3,804,080

DEVICE FOR OBTAINING MEASUREMENT AT OR WITHIN PARTS OF THE HUMAN BODY

BACKGROUND OF THE INVENTION

This application relates generally to a measuring head for mounting at or within parts of the body, for example in cavities of the human body.

It is well-known to take physiological measurements in cavities of the human body, for example, measurements of an unborn baby during childbirth, by using an electrode in the form of a spiral catcher having two needle-like ends which are displaced relative to each other by 180°. This catcher is placed at a part of a body and is fixed into the body by a short turn. A second electrode of opposite polarity, called a counter electrode is mounted on a separate lead and is introduced into the vicinity of the first electrode. However, since the two electrodes are not located in a well-defined position relative to each other, the measurement can be adversely affected. This is especially true if, for example, the fetus or the mother move during the measurement and thereby change their position. The introduction of the aforementioned catcher electrode into the cavity is performed manually or by means of a tampon holder.

U. S. Pat. Application, Ser. No. 207,421, filed Dec. 13, 1971, in the name of Helge Ruttgers and assigned to the same assignee as the present invention describes a measuring head having a carrier which carries both a catcher electrode and a second metal member which is outwardly accessible and which serves as an electrode of opposite polarity, i.e., a counter electrode. Although this arrangement does assure that the two electrodes of the measuring head always have the same position relative to each other, the device depends largely on body fluids to complete the electrical connection between the electrodes.

SUMMARY OF THE INVENTION

The present invention provides a device in which there was a definite and reliable electrical path between the two electrodes. The invention improves the reliability of the measurements, and has the advantage that it can continue to provide measurements from a viable fetus even after it has been extracted from the mother's body. The illustrated embodiments of the present invention include a measuring head for placing or mounting at or within parts of the body, for example, in cavities of the human body, including a spiral catcher having two catcher arms electrically isolated from each other. Each arm has one pointed end and the two ends are displaced from each other by 180°. The other end of each arm is connected to an electrical lead. Thus, the two catcher arms form the two signal electrodes. In one embodiment the catcher is surrounded with insulating material contained in a carrier. According to another embodiment the carrier carries at least one cannula connected to a liquid line at the base of the carrier for introducing medicine to the measuring point. The cannula protrudes centrally between the spiral arms of the catcher, the protruding end having a pointed shape, and the length of the protrusion over the carrier being adjustable. In still another embodiment at least one of the outwardly extending arms of the catcher is itself formed as a tube which serves as a cannula.

DESCRIPTION OF THE PREFERRED EMBODIMENTS

Figure 1:
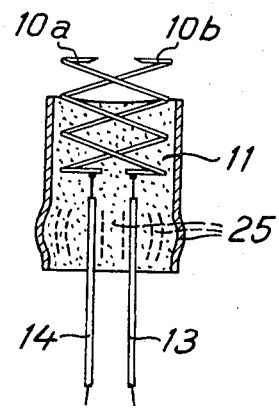
FIGS. 1 through 4 are sectional views of different embodiments of the measuring head.

The measuring head represented in FIG. 1 includes a catcher which is formed of the two parts 10a and 10b. These parts are mounted such that their free ends are pointed and are lying in a plane which is normal to the longitudinal axis of the measuring head. The ends are displaced by 180° relative to each other. The parts 10a and 10b are surrounded by an electrically insulating material 11 such that their ends project resiliently from this material. The parts 10a and 10b are connected to electrical lines 14 or 13, respectively, forming the two electrodes of the measuring head. Their position relative to each other is fixed. The insulating material has projections 25 on its shell surface which simplify the handling of the measuring head.

Figure 2:
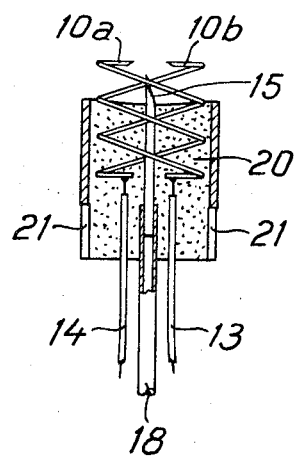

In FIG. 2, a measuring head is represented in which the two parts of 10a and 10b of the catcher are surrounded with an insulating material 20 having a cylinder-like shape and having recesses 21 for better handling. Additionally, a tube, or cannula, is embedded in this material, placed so that it projects slightly over the mounting face of the material. This free end of the tube is pointed in a known manner. The other end of the tube is connected to a liquid line 18. These additional parts enable an electrolyte to be supplied to the area of the body in which the measurement is to be made in order to improve the measurement. It is also possible to use this tube to inject or remove fluid for medical treatment purposes.

Figure 3:
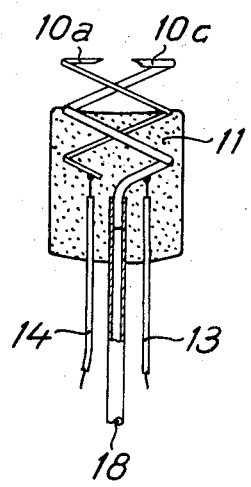

In the embodiment of FIG. 3, one arm 10c of the catcher is itself formed as a tube and is connected with a liquid line 18. Thus, the catcher arm 10c is used for two purposes, namely as a cannula with the liquid line 18, and as an electrode with the electrical line 13.

Figure 4:
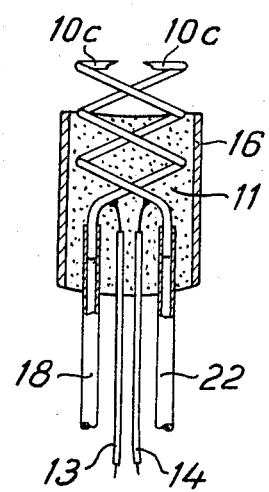

FIG. 4 illustrates that both arms 10c of the catcher can be formed as tubes, whereby further possibilities are offered for the inlet and outlet of liquids. Here, the arms are surrounded by an insulating material 11 contained in a surrounding shell 16. Also, in this embodiment the ends of the leads 13, 14 and 18, 22 are surrounded with insulating material.

We claim:

1. An apparatus for obtaining measurement signals at or within cavities of the human body, comprising a carrier formed from an electrically insulating material; a spiral catcher supported by said carrier, said catcher comprising two electrodes in the form of two catcher arms which are electrically isolated from each other and positioned to extend beyond the carrier, one end of each arm being connectable to an electrical signal lead and the other end of each arm terminating in a pointed shape, the pointed ends being displaced 180° relative to each other.

2. The apparatus of claim 1, including at least one tube positioned within the carrier, one end of said tube protruding beyond the end of the carrier, the other end of said tube being connectable to a liquid line.

3. The apparatus of claim 2 wherein the tube protruding beyond the end of the carrier is pointed and is positioned centrally between the spiral arms.

4. The apparatus of claim 3, wherein the tube protruding beyond the carrier includes a portion which is adjustable in length.

5. The apparatus of claim 2 wherein one of the catcher arms is formed from a tube, and is connectable to a liquid line.

* * * * *